July 28, 1925. 1,547,572
A. W. EMPSON
CENTRIFUGAL PURIFYING AND DEHYDRATING APPARATUS
Filed Sept. 2, 1924
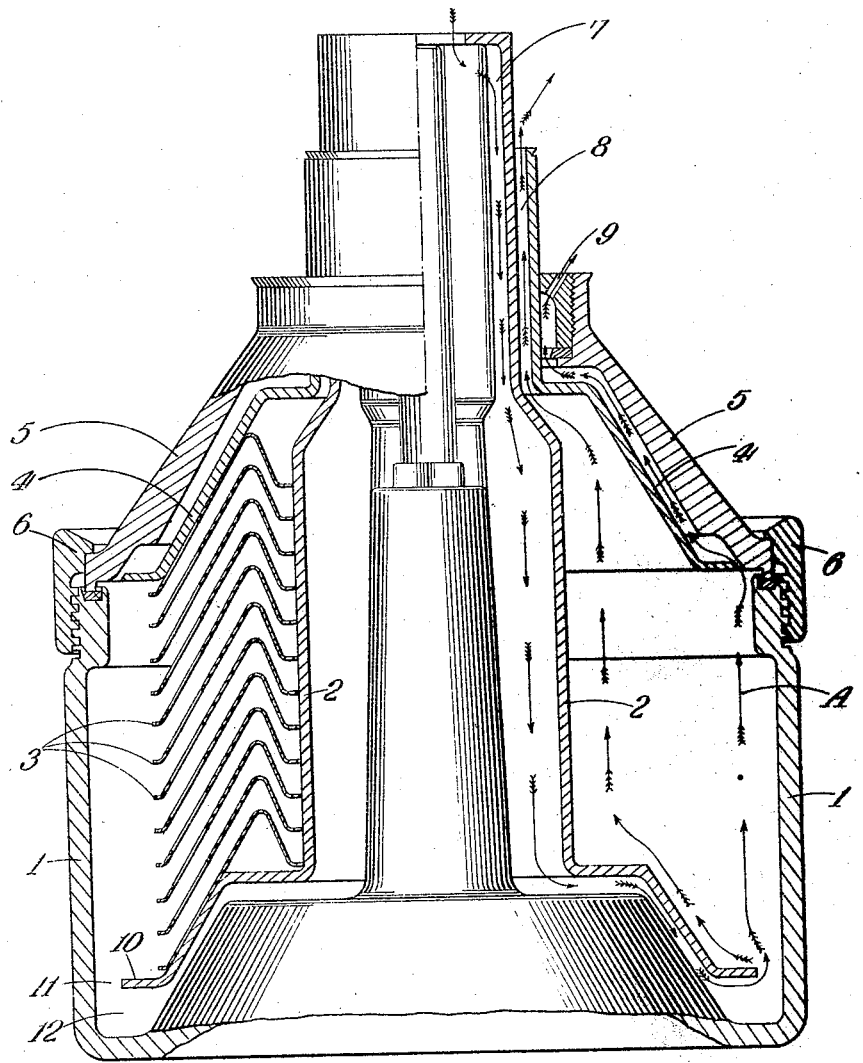
Alfred Walker Empson
INVENTOR
by Seward Davis
HIS ATTORNEY.

Patented July 28, 1925.

1,547,572

UNITED STATES PATENT OFFICE.

ALFRED WALKER EMPSON, OF WESTMINSTER, LONDON, ENGLAND.

CENTRIFUGAL PURIFYING AND DEHYDRATING APPARATUS.

Application filed September 2, 1924. Serial No. 735,283.

*To all whom it may concern:*

Be it known that I, ALFRED WALKER EMPSON, a British subject, residing at 39 Victoria Street, Westminster, London, England, have invented certain new and useful Improvements in Centrifugal Purifying and Dehydrating Apparatus, of which the following is a specification, reference being had to the drawings accompanying same and forming a part thereof.

My invention relates to centrifugal purifying and dehydrating apparatus for separating water and impurities from fluids such as transformer, switch and lubricating oils.

The objects of my invention are, in apparatus of the character named, to secure intimate contact of the impure oil with a washing medium, and to insure the removal of the minute impurities carried in suspension therein and to dehydrate the purified oil.

With the foregoing and additional objects of advantage and utility attained by the preferred form of the structural embodiment of my invention shown in the drawings and hereinafter more particularly pointed out, my invention, briefly stated, consists in causing the oil which is to be purified to emerge as a fine film into water, and to contact intimately with the water seal, and then in causing the separation of the purified oil from the wash water.

Referring to the accompanying drawing illustrating a known type of apparatus, partly in section and partly in elevation, 1 represents the drum, 2 the disc carrier seated and centralized on the conical bottom, 3 a plurality of discs mounted on the carrier, 4 the so-called discharge disc and 5 the drum top secured by ring 6. The inlet passage for the oil to be treated is designated 7, the outlet for oil purified 8, and the outlet for water 9. The arrows indicate the several directions of flow.

According to the present invention the disc carrier 2 is formed with a skirt terminating in a flange 10 adjacent the periphery of the drum and outwardly beyond the peripheries of the discs 3, leaving a narrow passage 11 for the incoming fluid. The incoming fluid to be treated must therefore issue at the initial stage of separation as a relatively thin film through the passage 11.

When such apparatus is used for dehydrating purposes it is desirable to give the oil the longest path of travel between the discs, to which end adjustments are made, so as to keep the line of demarcation between the fluids near to the periphery of the discs and preferably outside the periphery of same, as indicated by the line of arrows at A. The oil to be treated enters the drum at a point outside the line of demarcation.

While passing round the extension or flange 10 the contaminated oils or other fluid is intimately mixed with water or other liquid preparatory to separation and this washing action has been found advantageous in the separation of particles of fibre and other materials more particularly particles of very small dimensions which can generally only be detected with the aid of a microscope.

The arrangement hereinbefore described of passing the whole of the oil to be treated in the form of a thin film through a liquid seal in the bowl enables me to introduce a reagent into the liquid as for example a counter colloid. In such cases the apparatus is fitted with a device which feeds the reagent or equivalent chemicals automatically in the required regulatable proportions.

My invention is not necessarily limited to the treatment of oil, but is applicable to the treatment of other contaminated fluids.

I claim:

1. Centrifugal purifying and dehydrating apparatus comprising in combination a drum, a hollow disc carrier mounted in said drum, a plurality of discs mounted on said carrier in superimposed spaced relationship, and a skirt for said carrier terminating in a flange projecting outwardly beyond the peripheries of said discs and adjacent the periphery of said drum, whereby an inlet passage is provided for the fluid to be treated extending through said carrier, underneath said skirt and its flange and opening between the edge of said flange and the periphery of said drum, the said opening between the edge of said flange and the periphery of said drum constituting a narrow passage through which the incoming fluid emerges as a relatively thin film.

2. In a centrifugal dehydrating apparatus adapted to the purification of oil, in combination, a drum, a hollow disc carrier mounted in said drum, a plurality of discs mounted on said carrier in superimposed spaced relationship, and a skirt for said carrier terminating in a flange projecting outwardly beyond the peripheries of said discs and adjacent the inner periphery of said drum, whereby an inlet passage to said drum is provided for the admission of the oil to be purified and of the water for washing same, which said passage extends through said carrier underneath said skirt and its flange and opens between the edge of said flange and the periphery of said drum into the space between the outer peripheries of the discs and the inner periphery of the drum, the edge of said flange and the inner periphery of the drum being so spaced apart that the incoming oil emerges therebetween as a thin film adjacent the periphery of the drum and nearer to it than to the peripheries of the discs; an outlet passage for the purified oil, and an outlet for the water.

ALFRED WALKER EMPSON.